(No Model.)

J. KILLIP.
COUPLING FOR SHAFTING.

No. 280,188. Patented June 26, 1883.

Witnesses
W. B. Corwin.
Jno. K. Smith

Inventor
John Killip
by his attorneys
Bakewell & Kerr

UNITED STATES PATENT OFFICE.

JOHN KILLIP, OF ALLEGHENY, ASSIGNOR TO BAIR & GAZZAM, OF PITTSBURG, PENNSYLVANIA.

COUPLING FOR SHAFTING.

SPECIFICATION forming part of Letters Patent No. 280,188, dated June 26, 1883.

Application filed March 5, 1883. (No model.)

*To all whom it may concern:*

Be it known that I, JOHN KILLIP, of Allegheny, in the county of Allegheny and State of Pennsylvania, have invented a new and useful Improvement in Coupling for Shaftings; and I do hereby declare the following to be a full, clear, and exact description thereof, reference being had to the accompanying drawings, forming a part of this specification, in which—

Figure 1:
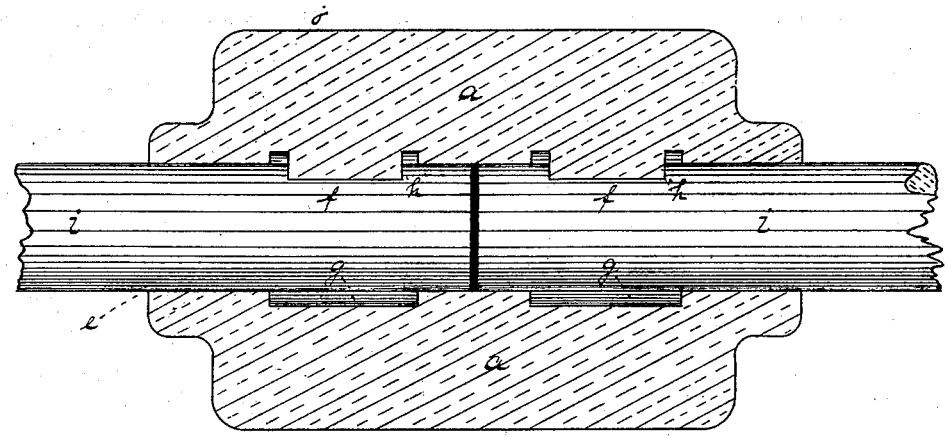
Figure 2:
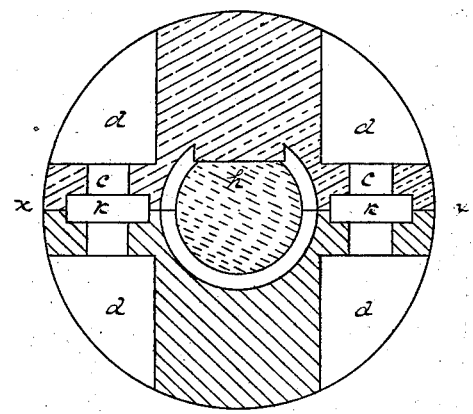

Figure 1 is a side elevation of the shafting, showing a longitudinal section of the coupler. Fig. 2 is a cross-section of the coupler and shaft on line $y\,y$, Fig. 1.

Like letters refer to like parts wherever they occur.

My invention relates to an improvement in couplings for shafting and other similar purposes.

I will now describe my invention, so that others skilled in the art may manufacture and use the same.

In the drawings, $a$ represents the body of the coupler, which is preferably a casting in two parts, and joined together in a longitudinal line, as at $x\,x$, Fig. 2, by bolts passing through the bolt-holes $c$. In the outer surface of the two parts of this coupler are recesses $d$, in which the heads of the bolts fit. Through the center of this coupler is a cylindrical bore, $e$, of the same diameter as the outer diameter of the shafting. Extending into this bore $e$ from one of the sections of the coupler are two or more projections or lugs, $f\,f$, the sides and lower faces of which have plain surfaces, and are at right angles to each other. Extending around both sections of the coupler, in the inner face thereof, on both sides of the lugs $f$, are grooves or spaces $g\,g$. These grooves or spaces extend longitudinally a little beyond the lugs $f\,f$. The lugs $f\,f$ are part of and integral with the body of the coupler $a$, and may be formed on both sections of the same, thereby making four or more such lugs, if desired. In the sides of the shafts $i$ are recesses $h\,h$, of rectangular form.

My improved coupler is used as follows: The two ends of the shafting being brought together, the two sections of the coupler are placed on the shaftings so that the lugs $f\,f$ will fit in the recesses $h\,h$ in the shaftings $i\,i$, and are bolted together, thereby firmly securing and keying together the ends of the shafting, so that the power applied to one portion of the shafting will be communicated to the other. The purpose of the spaces $g\,g$ is to allow of the passage or clearance of the lathe-tool beyond the lugs $f\,f$, and to allow a certain portion of the inner circumference of the coupler to be left rough as it comes from the molds; and as that portion does not touch or come in contact with the shafting it is not necessary that it should be bored out, which would be extremely difficult, if not impossible, by means of a lathe-tool, on account of the projecting lugs $f\,f$, which are situated at that portion of the circumference of the coupler. The ends of the lugs $f\,f$ and the slots $h\,h$ in the shafting $i\,i$ having square or right-angled corners in vertical shafting, the two ends of the shafting need not rest one on the other; but the shaftings are in part supported by the lugs in the slots. On each side of the bolt-holes $c$, at the meeting surfaces of the two parts of the coupler, are grooves $k\,k$, extending lengthwise along the coupler, the purposes of which are that should the plain faces of the lugs $f\,f$ and the faces of the grooves in the shafting become worn and not fit closely one against the other, then, by filing the meeting surfaces of the coupling, and by filing the faces of the lugs $f\,f$, the lugs $f\,f$ may be caused to fit tightly against the shafting, while the meeting surfaces of the two parts of the coupling fit tightly against each other, and, on account of these grooves, there is less filing and work to be done than there would otherwise be if all the meeting surfaces of the coupler had to be filed down. These sections of the coupler, as described, may be cast of any suitable material, the spaces $g\,g$ and lugs $f\,f$ being formed during the casting operations.

The advantages of my invention are, that the ends of the shafting are firmly held together, that there are no keys to become loose or wear away and have to be replaced, and in the additional support and strength it affords to the joint in the shafting.

Having thus described my invention, what I claim, and desire to secure by Letters Patent, is—

1. A shaft-coupling composed of longitudinal separable sections having a central bore, one of said sections having rectangular flat-faced keys, which project into the cavity of the coupling, said keys surrounded by relief-channels, substantially as and for the purposes specified.

2. A shaft-coupling composed of longitudinally-separable sections having a central bore, each section having longitudinal grooves on its edges parallel to the axis of the bore, substantially as and for the purposes specified.

3. The combination, with the shafts having flat recesses $h\ h$, of a coupling composed of longitudinally-separable sections, one of said sections having rectangular flat-faced projections $f\ f$, which project into the recesses $h\ h$ of the shafts, substantially as and for the purposes specified.

In testimony whereof I have hereunto set my hand this 1st day of March, A. D. 1883.

JOHN KILLIP.

Witnesses:
W. B. CORWIN,
JAMES K. BAKEWELL.